(12) United States Patent
Owusu et al.

(10) Patent No.: US 9,636,938 B2
(45) Date of Patent: May 2, 2017

(54) FILMS FOR PRINTING

(71) Applicant: Avery Dennison Corporation, Glendale, CA (US)

(72) Inventors: Osei Owusu, Concord Township, OH (US); Shanshan Wang, Mentor, OH (US); Vadim Zaikov, Perry, OH (US); Chieh-Wen Chen, Willoughby Hills, OH (US); Michael Ramsay, Newbury, OH (US); Wen-Li A. Chen, Rochester, NY (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/565,658

(22) Filed: Dec. 10, 2014

(65) Prior Publication Data

US 2015/0183253 A1    Jul. 2, 2015

Related U.S. Application Data

(60) Provisional application No. 61/921,641, filed on Dec. 30, 2013.

(51) Int. Cl.
*B41M 5/50* (2006.01)
*B41M 5/52* (2006.01)
*C08J 5/18* (2006.01)

(52) U.S. Cl.
CPC .......... *B41M 5/5254* (2013.01); *B41M 5/502* (2013.01); *B41M 5/506* (2013.01); *B41M 5/508* (2013.01); *B41M 5/5218* (2013.01); *B41M 5/5227* (2013.01); *C08J 5/18* (2013.01); *B41M 2205/42* (2013.01); *C08J 2325/06* (2013.01); *C08J 2423/06* (2013.01)

(58) Field of Classification Search
CPC .. B41M 5/508; B41M 5/5218; B41M 5/5227; B41M 2205/42; C08J 5/18; C08J 2325/06; C08J 2423/06
See application file for complete search history.

(56) References Cited

U.S. PATENT DOCUMENTS

| | | |
|---|---|---|
| 4,686,118 A | 8/1987 | Arai et al. |
| 6,589,636 B2 | 7/2003 | Emslander et al. |
| 6,605,337 B1 | 8/2003 | Mori et al. |
| 6,793,859 B2 | 9/2004 | Emslander et al. |
| 6,800,341 B2 | 10/2004 | Emslander et al. |
| 6,857,737 B2 | 2/2005 | Emslander et al. |
| 7,935,398 B2 | 5/2011 | Park et al. |

(Continued)

FOREIGN PATENT DOCUMENTS

| | | |
|---|---|---|
| JP | 1999078222 | 3/1999 |
| JP | 3077694 | 8/2000 |

(Continued)

OTHER PUBLICATIONS

International Search Report and Written Opinion issued in corresponding IA No. PCT/US2014/069452 dated Apr. 10, 2015.

(Continued)

*Primary Examiner* — Laura C Powers
(74) *Attorney, Agent, or Firm* — Avery Dennison Corporation

(57) ABSTRACT

Printing layers and films for printing are disclosed. Methods for preparing such films also are disclosed.

31 Claims, 4 Drawing Sheets

(56) References Cited

U.S. PATENT DOCUMENTS

| | | |
|---|---|---|
| 8,003,176 B2 | 8/2011 | Ylitalo et al. |
| 2002/0187341 A1* | 12/2002 | Ko et al. ............... 428/343 |
| 2003/0041962 A1* | 3/2003 | Johnson et al. ............ 156/266 |
| 2008/0280111 A1* | 11/2008 | Blackwell et al. ........... 428/200 |
| 2010/0058656 A1 | 3/2010 | Chevalier et al. |
| 2011/0003096 A1* | 1/2011 | Holbert et al. ............ 428/32.11 |
| 2011/0091132 A1 | 4/2011 | Kumar et al. |

FOREIGN PATENT DOCUMENTS

| | | |
|---|---|---|
| JP | 2000-335082 | 12/2000 |
| WO | 96/26840 | 9/1996 |
| WO | 99/29512 | 6/1999 |
| WO | 2013/019699 | 2/2013 |
| WO | 2013/033484 | 3/2013 |
| WO | 2013/126452 | 8/2013 |

OTHER PUBLICATIONS

International Preliminary Report on Patentability issued in corresponding IA No. PCT/US2014/069452 dated Jul. 14, 2016.

\* cited by examiner

FILMS FOR PRINTING

CROSS-REFERENCE TO RELATED APPLICATION

The present application claims the benefit of U.S. Provisional Application No. 61/921,641 filed Dec. 30, 2013, which is incorporated herein by reference in its entirety.

BACKGROUND OF THE INVENTION

Films may be used for printing materials, such as signs and banners. Inkjet printers may be used to print upon such materials using solvent, eco-solvent, mild solvent, latex, and/or ultraviolet ("UV") inks. The present invention includes films for printing and methods of their manufacture.

SUMMARY OF THE INVENTION

In one embodiment, the invention includes a printing layer of a film comprising a blend of at least one high absorption capacity material and at least one low absorption capacity material.

In another embodiment, a film for printing. The film includes a print layer, a core layer, and an adhesive layer, and the core layer is between the print layer and the adhesive layer. In addition, the printing layer includes a blend of at least one high absorption capacity material and at least one low absorption capacity material.

The following description illustrates one or more embodiments of the invention and serves to explain the principles and exemplary embodiment of the invention.

DETAILED DESCRIPTION OF EXEMPLARY EMBODIMENTS

Figure 1:
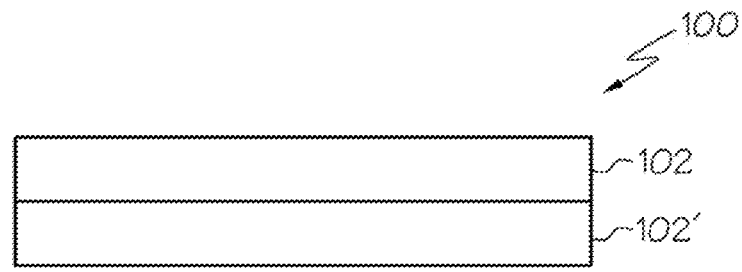
FIG. 1 depicts an exemplary embodiment of a film of the present invention.

Reference will now be made in detail to exemplary embodiments of the present invention, one or more examples of which are illustrated in the accompanying drawings. Each example is provided by way of explanation of the invention and not by limitation of the invention. It will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. In addition, the use of reference characters with the same two ending digits as other reference characters to indicate structure in the present specification and drawings, without a specific discussion of such structure, is intended to represent the same or analogous structure in different embodiments. Unless otherwise indicated herein, all percentages used for a component refer to the percentage by weight.

In some embodiments, the present invention includes films and other materials for printing or marking with ink. In some embodiments, materials of the present invention may include a print layer (also interchangeably referenced as a printing layer herein), an optional tie layer, a core layer, and an adhesive layer. In other embodiments, such materials may exclude certain layers. In some embodiments, the total film thickness may be from about 2.5 mils to about 3.2 mils.

Print layers of the present invention may include a blend of at least one high absorption capacity material, such as poly(methyl methacrylate) ("PMMA"), polystyrene, polyethylene terephthalate glycol-modified (PETG), and styrene-based copolymers, impact modified polystyrene, styrene acrylic copolymer, styrene-olefin copolymer, styrene-acrylic-olefin copolymer, acrylonitrile butadinene styrene polymer, styrene acrylonitrile polymer, and copolyester polymer, and at least one low absorption capacity material, such as an olefin polymer, including random copolymers and/or block copolymers. By way of example, suitable olefin copolymers may include, without limitation, ethylene acrylate coplomers, such as ethylene acrylic acid (EAA), ethylene methyl acrylate (EMA), and ethylene butyl acrylate (EBA), ethylene vinyl acetate (EVA), and/or ethylene acrylic ester terpolymer. As used herein, unless the context dictates otherwise, the term copolymers may also reference terpolymers. In one particular embodiment of the present invention, the print layer includes PMMA and an olefin polymer, including random copolymers and/or block copolymers.

Any suitable formulation may be used. In some embodiments, at least 10% low absorption capacity material may be present in the formulation. In other embodiments, at least 17% low absorption capacity material may be present in the formulation. In addition, in some embodiments at least 20% high absorption capacity material may be present in the formulation. In some embodiments, about 20% to about 83% high absorption capacity material may be present. In still some embodiments, less than 83% high absorption capacity material may be present. Notably, neither PMMA nor olefin copolymers were observed during testing to independently provide suitable materials for ink printing.

A print layer may have any thickness suitable for a particular embodiment. In some embodiments, a print layer may have a thickness greater than about 0.38 mils. In some embodiments, a print layer may have a thickness in the range of about 0.6 mils to about 1.0 mils, including each intermittent value therein. In other embodiments, a print layer may have a thickness in the range of about 0.6 mils to about 3.0 mils. In still other embodiments, a print layer may have thickness up to about 6.0 mils. Any remaining layers of the film may be of any suitable thickness for a particular embodiment.

In some embodiments, the print layer may include multiple adjacent layers. For example, in some embodiments, a print layer may include two adjacent layers, wherein each layer includes the same blend of at least one high absorption capacity material and at least one low absorption capacity material. In addition, in some embodiments at least one layer of the two adjacent layers further includes absorbing particles, such as silica, alumina silicate, nano clay, calcium carbonate, zinc oxide, titanium dioxide, and/or other absorbing particles or other suitable absorbing particles or resins. In some embodiments, the particle sizes may be in the range of about 0.1 to about 10 microns, including each intermittent value therein. In addition, multiple particle sizes may be present in some embodiments. For example, various particle sizes may be present in a single print layer in some embodiments. In addition, embodiments having multiple print layers may each have either the same or distinct particle sizes.

By way of example, FIG. 1 depicts an embodiment of print layer 100 having layer 102, which includes at least one high absorption capacity material and at least one low absorption capacity material, and layer 102', which includes the same composition as layer 102 but further includes absorbing particles. Although not shown, adhesive, such as a pressure sensitive adhesive, may be disposed upon an outer face of the film and a release liner (not shown) may optionally be in contact with the adhesive such that the adhesive is between the release liner and the outer face of the film. In some embodiments, the film comprises a removable release liner and a pressure sensitive adhesive, wherein the pressure sensitive adhesive is disposed upon the adhesive layer and the release liner is adjacent to the pressure sensitive adhesive, such that the pressure sensitive adhesive is disposed between the adhesive layer and the release liner.

In some other embodiments, additional layers having either the same or different compositions may be included in a multilayer print layer. In still other embodiments, a film of the present invention may be a single layer consisting of only the printing layer. In such embodiments, an adhesive, such as a pressure sensitive adhesive, may be applied directly upon that layer. Each layer of a multilayer print layer may be of the same thickness or may have varying thicknesses.

In some embodiments of the present invention, a multilayer print layer may have a morphological gradient. In such embodiments, a print layer may include a first layer in which PMMA is the major component of the blend in the layer and a second layer having the same blend components as the first layer but in which PMMA is the minor component. This may create different absorption capacity between the two adjacent layers forming the image receptive layer. The print layer may include at least one layer comprising at least 50% by weight PMMA and at least one layer comprising less than 50% by weight PMMA.

The print layer may be formulated to include an ultraviolet stabilizer package in some embodiments, particularly when the materials are intended to be used for outdoor display. In some embodiments, a suitable ultraviolet stabilizer may include the ultraviolet light stabilizer Ampacet UV 10561, available from Ampacet Corporation. By way of further example, the ultraviolet stabilizer package may include free radical scavengers and an ultraviolet light stabilizer. Free radical scavengers, such as hindered amine light stabilizer (HALS), may be present, alone or in addition to UV light stabilizers, in an amount of about 0.05 to about two weight percent per layer, and the UV light stabilizers, such as benzophenone, can be present in amounts ranging from 0.1 to about 5 weight percent per layer. Such ultraviolet stabilizer packages may be included in the print layer. In multilayer print layers, such ultraviolet packages may be included in some or all of the layers of the print layer.

Similarly, print layers of the present invention may also or alternatively include heat stabilizers. Heat stabilizers may include Ferro 1237, Ferro 1720, and Synpron 1163, all available from Ferro Corporation Polymer Additives Division, and Mark V 1923, available from Witco Corp. By way of example, heat stabilizers may be present in an amount from about 0.2 to about 0.15 percent by total weight of a print layer, including each intermittent value therein. In multilayer print layers, such heat stabilizers may be included in some or all of the layers of the print layer.

In some embodiments, a print layer may also include a compatibilizer. By way of example, a suitable compatibilizer may include a block copolymer. In some particular embodiments, styrene-ethylene-butylene-styrene may be included as a compatibilizer in a print layer, such as in a print layer having a blend of PMMA and ethylene copolymer. A compatibilizer also may improve the gloss of the print layer in some embodiments. In multilayer print layers, such compatibilizers may be included in some or all of the layers of the print layer.

Some embodiments of print layers of the present invention may also include one or more process aids, such as Ampacet 10919, which is available from Ampacet Corporation. In addition, some print layer embodiments may include a flame retardant compound. By way of example, some embodiments may include FR-2005 (which is a flame retardant and ultraviolet stabilizer and available from Polyfil Corporation). In other embodiments, the print layer may also include one or more pigments, antiblock agents, and/or matting agents.

As indicated, materials of the present invention may also include a tie layer. When present, a tie layer may be located between a print layer and a core layer of the film. A tie layer may be comprised of any suitable material for a particular embodiment. In some embodiments, a tie layer may improve the interlayer adhesion between the print layer and the core layer. In some embodiments, a tie layer may be included if the blend of the print layer includes more than 50% by weight of PMMA.

Suitable tie layer resins may include, by way of example, ethylene vinyl acetate, such as those sold by Celanese under the Ateva trade name, Elvax resins sold by ExxonMobil, Bynel resins sold by Dupont Corporation, and Evatane resins sold by Arkema. In addition, other resins suitable for a tie layer may include random terpolymer of ethylene, vinyl acetate and maleic anhydride, such as OREVAC-T9304 sold by Arkema, and materials of similar structure.

Embodiments of the present invention may also include a core layer. Such core layers may be comprised of any material to provide suitable mechanical strength and a desired opacity to the film. In some embodiments, any suitable olefin polymer or combination of olefin polymers may be included in the core layer. By way of example, a core layer may be comprised of any suitable olefin polymer. In some embodiments, a core layer may comprise polyethylene, such as low density polyethylene and/or linear low density polyethylene may be present in the core layer. In other embodiments medium density and/or high density polyethylene may be present in the core layer. In addition, the core layer may optionally include color pigments.

In some embodiments, the present invention may also include an adhesive layer. The adhesive layer may include ethylene vinyl acetate. In some embodiments, the adhesive layer may also include polyethylene, such as low density polyethylene and/or linear low density polyethylene. An adhesive layer may also have one or more ultraviolet stabilizers, process aids, and/or flame retardants. A suitable adhesive may be applied to the adhesive layer, optionally with a release liner, in some embodiments.

Figure 2:
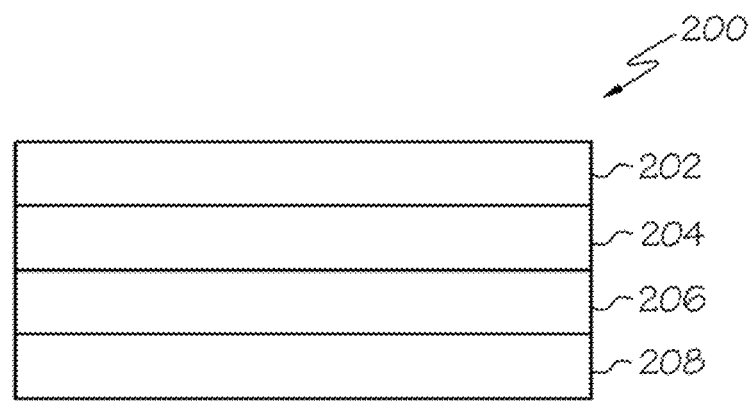
FIG. 2 depicts an additional exemplary embodiment of a film of the present invention.

FIG. 2 provides an exemplary embodiment of a film of the present invention. As shown, FIG. 2 depicts a film 200 having a print layer 202, a tie layer 204, a core layer 206, and an adhesive layer 208. The layers of this example may have the compositions as described above.

Figure 3:
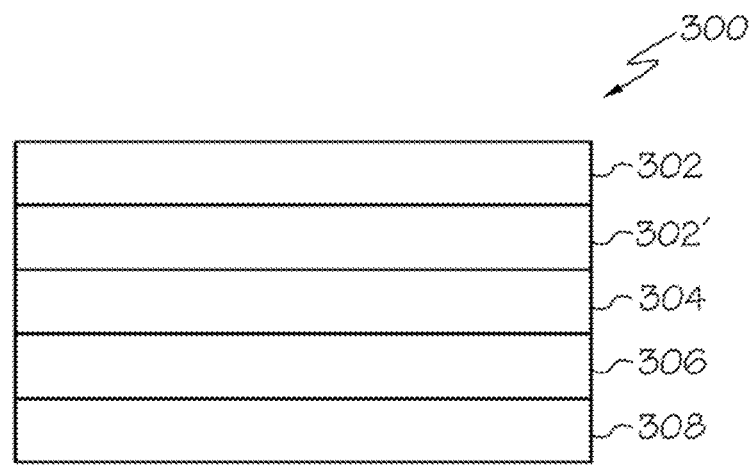
FIG. 3 depicts an additional exemplary embodiment of a film of the present invention.

FIG. 3 provides another exemplary embodiment of a film of the present invention. As shown, FIG. 3 depicts a film 300 having a multilayer print layer including layer 302 and layer 302', a tie layer 304, a core layer 306, and an adhesive layer 308. The layers of this example may have the compositions as described above. In this embodiment, the multilayer print layer may optionally create a morphological gradient.

In some embodiments, as indicated above, films of the present invention may also include a pressure sensitive adhesive layer and a releasable liner. The adhesive may be applied upon any suitable layer of the film, such as, for example, an adhesive layer. In single layer embodiments, the adhesive may be applied directly upon that single layer. The release liner may be position adjacent the adhesive such that the adhesive is disposed between the release liner and the film.

Films of the present invention may be prepared using any suitable process. By way of example, films of the present invention may be prepared using cast film processes, blown film processes, and extrusion and coextrusion processes.

Films of the present invention may be configured to provide suitable qualities for printing, such as receiving ink from a printer, including ink jet printers. In such embodiments, the ink absorption capacity and the absorption speed of the film, and specifically the print layer of a film, provide a suitable printing surface for good quality printing. In such embodiments, films of the present invention may dry suitably such that the ink does not remain wet for an undesirable period of time, and such films may also dry without significant cracking in the ink. The following examples provide additional details of exemplary embodiments of films of the present invention.

In the following examples, films having a total thickness of 2.5 to 3.2 mils were prepared. In addition, the films were tested using a core layer comprised of 57% low density polyethylene (such as available from Flint Hills Resources ("FHR")) and 43% $TiO_2$ (such as available from Ampacet Corporation) and an adhesive layer of 60% low density polyethylene, 30% Ampacet 111712, and 10% ethylene vinyl acetate. For all examples, the gloss was measured using a BYK Gardner gloss meter, and the gloss reported is the average of the gloss measured in the machine direction (MD) and the cross direction (CD). The reference table below provides an index to materials referenced in the following examples:

| Material | Description and Supplier |
| --- | --- |
| PLEXIGLAS HFI-7 | PMMA resin available from Arkema |
| Lotryl 29MA03 | Random copolymer of ethylene and methyl acrylate available from Arkema under the brand name Lotryl |
| Lotader AX 8900 | Random terpolymer of ethylene, methyl acrylate, and glycidyl methacrylate available from Arkema under the brand name Lotader |
| Lotader 4700 | Random terpolymer of ethylene, ethyl acrylate, and maleic anhydride available from Arkema under the brand name Lotader |
| Elvaloy 4924 | An ethylene/vinyl acetate/carbon monoxide (E/VA/CO) copolymer available from DuPont. |
| Kraton FG1924G | A linear triblock copolymer based on styrene and ethylene/butylene with a polystyrene content of 13% available from Kraton Polymers. |
| Primacor 1321 | An ethylene acrylic acid copolymer available from Dow Chemical. |
| Kraton G 2832 | A styrene-ethylene/butylenes-styrene (SEBS) block copolymer available from Kraton Polymers. |
| Denka TH-11 | A styrene butadiene PMMA copolymer available from Denka Corporation. |
| LA 2250 | Methyl methacrylate-butyl acrylate triblock copolymers available from Kuraray Co., Ltd. |
| K resin KR 53 | Styrene-Butadiene Copolymer available from Cheveron Phillips Chemical Company LP. |
| Styrenics 5410 | High impact polystyrene available from Ineos Styrenics |
| LA 4285 | (meth) acrylic thermoplastic elastomer from Kuraray Co Ltd. |
| Septon Q | Thermoplastic elastomer from Kuraray Co Ltd. |
| Levepren 400 | Ethylene vinyl acetate (40% VA content) from Lanxess |
| Krystalgran PN03-221 | Thermoplastic polyurethane from Huntsman Co. |
| Denka TH-11 | Styrene-butadiene-PMMA available from Denka Corporation. |
| Denka TX-100S | Styrene-PMMA available from Denka Corporation. |
| Nanostrength M51 | PMMA polybutylacrylate-PMMA available from Arkema. |
| Cadence GS2 | PETG copolyester available from Eastman Chemicals |
| EA3400 | General purpose crystal polystyrene available from Americas styrenics |
| Ateva 1821 A | EVA copolymer with 18% VA content available from AT Plastics Inc. |
| Zylar 960 | impact modified styrene acrylic copolymer available from Ineos styrenics |

Example I

Multilayer films were produced using a conventional 4-layer cast film co-extrusion process. Each of the four extruders A, B, C, D supplied a melt formulation to a feedblock where the melts were combined to form a single molten stream consisting of four different layers. To achieve a print layer thickness of about 0.6 to about 1.0 mils, both extruders A and B were fed with the print layer formulation as indicated in the following table. Extruders C was fed with molten layer of linear low density polyethylene for forming the core layer of the film and linear low density polyethylene and ethylene vinyl acetate for forming the adhesive layer were fed through extruder D. The extruder zone temperatures were Z1=390° F., Z2=420° F., and Z3=420° F. and the die temperature was 420° F. The extrudate from the die was cooled on a matte chill roll having a surface roughness average (Ra) of 40. The print layer contacted the chill roll during the cooling process with a chill roll temperature set at 90° F. and an airknife speed of 60 Hz. Table I shows the formulations used in the different extruders. In some variations in Example I, no tie layer was included in the film.

The films were tested for printability using eco-sol and latex inkjet systems. In the particular examples, printing of a multicolor test image was performed using a Roland Soljet Pro II XC-540 printer (available from Roland Company) equipped with eco-sol Max inkjet inks, and an HP Designjet L25500 printer (available from HP) equipped with HP 789 latex inks. In addition, print qualities were observed and recorded as reported in Table I below. As used below and in subsequent charts, "NM" designates that the value was not measured.

TABLE I

| Print Layer Blend | Unprinted Print Layer 60° Gloss | Roland Soljet Pro II XC-540 Quality | Roland Soljet Pro II XC-540 Printed Image 60° Gloss | HP Printer (L25500) Quality |
|---|---|---|---|---|
| 100% PLEXIGLAS HFI-7 | 58 | Cracks in image | NM | Dry, image is good |
| 83% PLEXIGLAS HFI-7 17% Lotryl 29MA03 | 51 | Dry to touch, no cracks | 55 | NM |
| 75% PLEXIGLAS HFI-7 25% Lotryl 29MA03 | 34 | Dry to touch, no cracks | 49 | NM |
| 75% PLEXIGLAS HFI-7 25% Lotader AX 8900 | 15 | Dry to touch, no cracks | 39 | NM |
| 75% PLEXIGLAS HFI-7 25% Lotader 4700 | 19 | Dry to touch, no cracks | 41 | NM |
| 40% PLEXIGLAS HFI-7 40% Ethylene vinyl acetate (18% VA) 20% Ethylene vinyl acetate (26% VA) | 17 | Dry to touch, no cracks, | 62 | Dry, no cracks, good image |
| 75% PLEXIGLAS HFI-7 25% Ethylene vinyl acetate | 34 | Dry to touch, no cracks | 52 | NM |
| 70% PLEXIGLAS HFI-7 30% Elvaloy 4924 | 23 | Dry to touch, no cracks | 45 | NM |
| 17% PLEXIGLAS HFI-7 83% Lotryl 29MA03 | 19 | Image is wet | NM | NM |
| 50% PLEXIGLAS HFI-7 50% Lotader AX 8900 | 12 | Dry to touch, no cracks | 20 | NM |
| 70% PLEXIGLAS HFI-7 30% Kraton FG1924G | 32 | Dry to touch, cracks in image | NM | No cracks |
| 70% PLEXIGLAS HFI-7 30% Primacor 1321 | NM | Dry to touch, coalescence | 37 | NM |
| 50% PLEXIGLAS HFI-7 50% Lotader 4700 | | Dry to touch, no cracks | 12 | NM |
| 30% PLEXIGLAS HFI-7 70% Lotryl 29MA03 | 16 | Dry to touch, no cracks | NM | NM |
| 30% PLEXIGLAS HFI-7 20% Ethylene vinyl acetate (26% VA) 30% Ethylene vinyl acetate (18% VA) 20% Kraton G 2832 | 20 | Dry to touch, no cracks | 55 | Image is good, no cracks |
| 30% PLEXIGLAS HFI-7 30% Ethylene vinyl acetate (26%) 40% Ethylene vinyl acetate (18%) | 17 | Dry to touch, no cracks | 61 | Image is good, no cracks |
| 80% PLEXIGLAS HFI-7 20% Denka TH-11 (Styrene butadiene PMMA copolymer) | 76 | Dry to touch, Cracks | NM | Image is good, no cracks |
| 50% Plexiglas HFI-7 50% LA 2250 | NM | Dry, image is slightly washed (poor color density) | NM | Good image |
| 50% Plexiglas HFI-7 25% LA 2250 25% Lotryl 29MA03 | NM | Good image | NM | Good image |
| 50% Styrenics 5410 50% Kraton G 2832 | NM | Good image | NM | Good image |
| 50% LA 4285 50% Lotryl 29MA03 | NM | Good image | NM | Good image |
| 50% Plexiglas HFI-7 50% Septon Q | NM | Good image | NM | Good image |

TABLE I-continued

| Print Layer Blend | Unprinted Print Layer 60° Gloss | Roland Soljet Pro II XC-540 Quality | Roland Soljet Pro II XC-540 Printed Image 60° Gloss | HP Printer (L25500) Quality |
|---|---|---|---|---|
| 50% Plexiglas HFI-7 50% Levepren 400 | NM | Good image | NM | Good image |
| 100% EA3400 | NM | Very light color density; film surface dissolved by the ink drops locally and, as result, it lots of tiny dents formed on the surface | NM | Good image |
| 100% Ateva 1812A | NM | print is very wet, severe ink bleeding | NM | Good image |
| 70% Styrenic 5410 + 30% Kraton G2832 | NM | Dry to touch, good image | NM | NM |
| 30% EA3400 + 70% Ateva 1821A | NM | Dry to touch, good image | NM | Good image |
| 50% EA3400 + 50% Ateva 1821A | NM | Dry to touch, good image | NM | Good image |
| 60% EA3400 + 40% Ateva 1821A | NM | Dry to touch, good image | NM | Good image |
| 60% EA3400 + 30% Ateva 1821A + 10% Kraton G2832 | NM | Dry to touch, good image | NM | Good image |
| 70% EA3400 + 30% Ateva 1821A | NM | Dry to touch, good image | NM | Good image |
| 50% Zylar 960 + 50% Ateva 1821A | NM | Dry to touch, good image | NM | Good image |
| 50% Cadence GS2 50% Lortyl 29MA03 | NM | Dry to touch, good image | NM | Good image |

Thus, it was observed that a suitable blend of high absorption material and low absorption material in a print layer resulted in suitable and improved print quality. Although ink cracking had been observed in films having over 83% PMMA without olefin copolymer in the print layer, such cracking was not shown for blends with 83% or less PMMA when blended with at least 10% by weight of olefin copolymer. In the Eco-sol inkjet printing, crystal polystyrene, impact modified styrene, and acrylic styrene copolymer themselves have high ink absorption and may be partially dissolved by an ink solvent at high ink loading, which may result in light color density and appearance of micro ink drop dents on a surface after printing. However, after blending such materials in the print layer with low ink absorption material(s) such as EVA or SEBS, it was observed in testing that the print quality was improved.

Figure 4A:
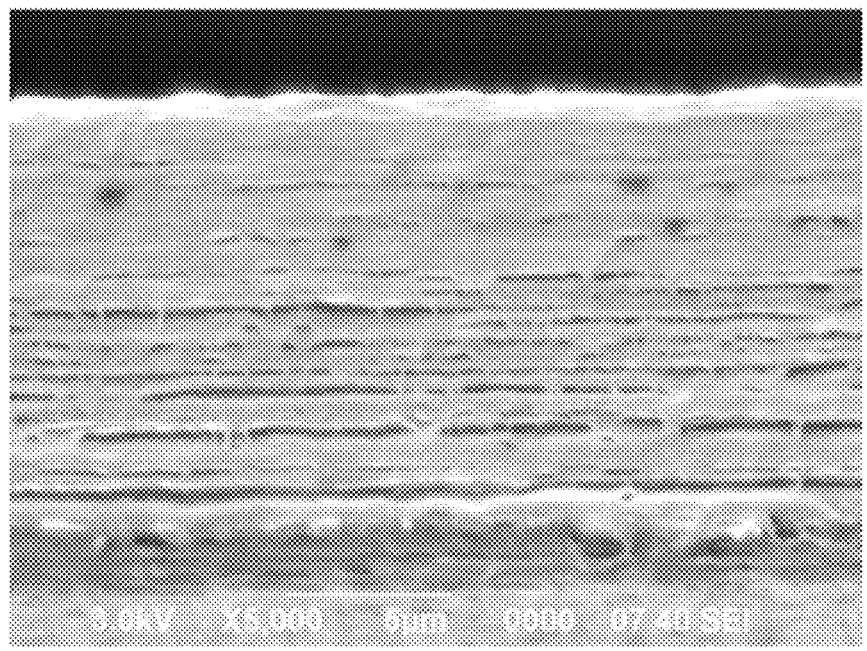
FIG. 4A is an electron scanning microscope image of a printing layer embodiment.
Figure 4B:
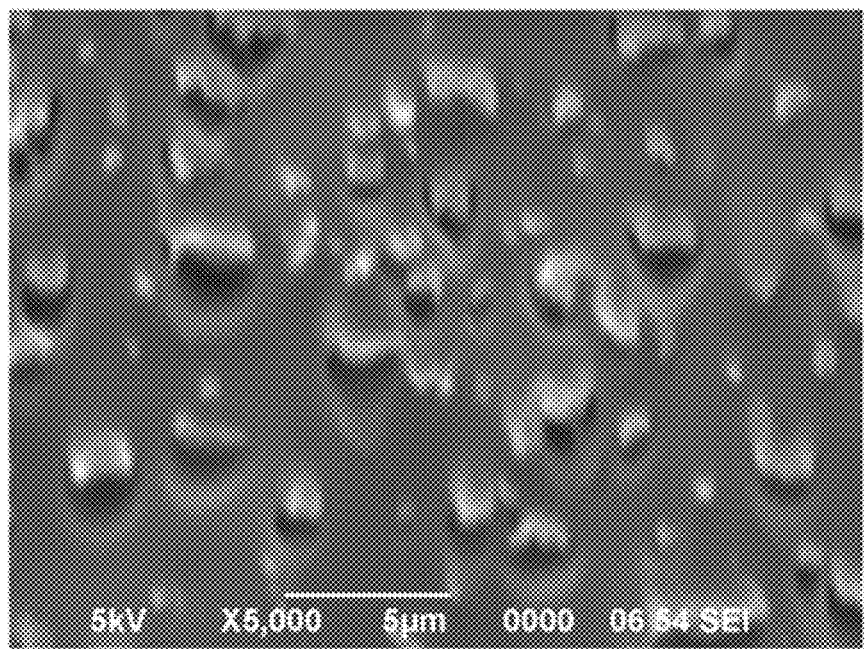
FIG. 4B is an electron scanning microscope image of an additional printing layer embodiment.
Figure 4C:
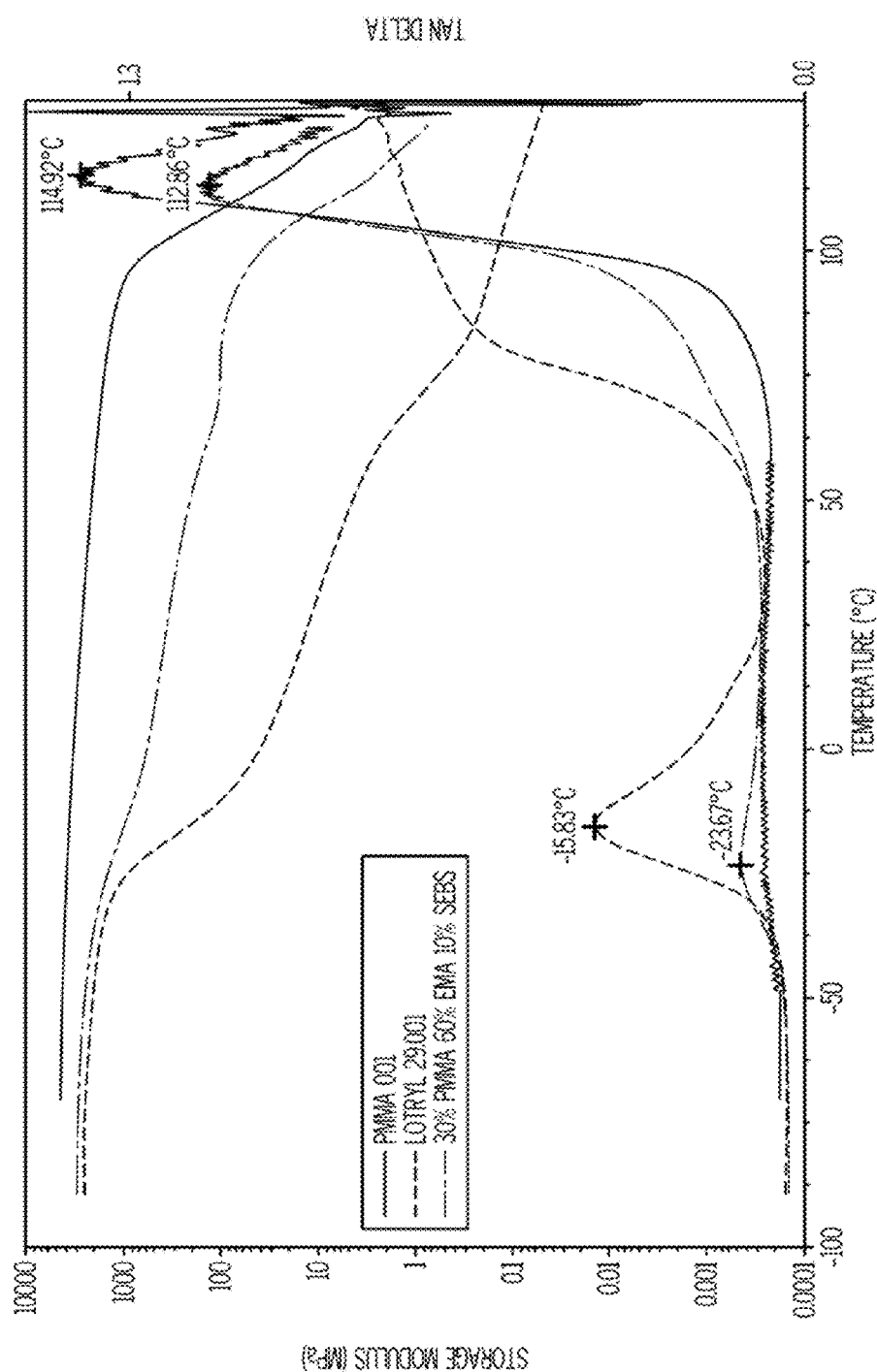
FIG. 4C is a DMA profile for the printing layers of FIG. 4A and FIG. 4C.

In addition, as shown in FIGS. 4A-4B, scanning electron microscope images were obtained for some of the examples in Table I. In particular, FIG. 4A is a scanning electronic microscope image of the film having a print layer of 83% Arkeman HIF-7 and 17% Lotryl 29MA03 and FIG. 4B is an image of a film having a print layer of 30% Arkema HFI-7 and 70% Lotryl 29MA03. As shown in those figures, the blend forming the print layer shows discrete domains, which indicates an incompatible blend. This incompatable blend is further confirmed by the DMA profile, which is shown in FIG. 4C. This profile depicts distinct glass transition temperatures (Tg) for the separate components of the blend. Furthermore, as shown in the profile, a comparison shows that the modulus of the blend lies between the modulus of each of the two components used to form the blend.

Example II

A multilayer film was prepared similar to Example I except the print layer included two layers comprised a blend of Plexiglas HFI-7 with different polymers at different ratios in the adjacent layers such that the absorption capacities of the two adjacent layers were different. The two adjacent layers collectively form the print layer of the film, and the print layer (including all layers in the print layer) was about 0.6 to about 1 mil thick. Table II shows the formulations used in the two adjacent layers. The core layer and the adhesive layers were the same as in Example I. The films of this example were then tested in the same manner described above for Example I, and the results are recorded below in Table II.

TABLE II

| Print Layer I | Print layer II | Roland Soljet Pro II XC-540 Printed Image 60° Gloss | Roland Soljet Pro II XC-540 Quality | HP Printer (L25500) Quality |
|---|---|---|---|---|
| 100% Lotryl 29MA03 | 30% PLEXIGLAS HFI-7 70% Lotryl 29MA03 | NM | Image is wet | Image good |
| 100% PLEXIGLAS HFI-7 | 100% Lotryl29MA03 | NM | Image is dry, cracks | NM |
| 70% PLEXIGLAS VM-100 30% Lotader 4700 | 50% PLEXIGLAS VM-100 50% Lotader 4700 | 35 | Dry to touch, no cracks | Dry, image good |

TABLE II-continued

| Print Layer I | Print layer II | Roland Soljet Pro II XC-540 Printed Image 60° Gloss | Roland Soljet Pro II XC-540 Quality | HP Printer (L25500) Quality |
|---|---|---|---|---|
| 60% PLEXIGLAS VM-100 40% Lotader 4700 | 50% PLEXIGLAS VM-100 50% Lotader 4700 | 17 | Dry to touch, no cracks | Dry, image good |
| 70% PLEXIGLAS HFI-7 30% Primacor 1321 | 50% PLEXIGLAS HFI-7 50% Primacor 1321 | 37 | Dry, coalesce, ink bleed | Dry, no cracks, image good |
| 50% PLEXIGLAS HFI-7 50% Lotader 4700 | 30% PLEXIGLAS HFI-7 70% Lotader 4700 | NM | Dry to touch, image good | Dry to touch, good image |
| 40% PLEXIGLAS HFI-7 60% Lotader AX 8900 | 50% PLEXIGLAS HFI-7 50% Lotader AX 8900 | 23 | Dry to touch, image good | Dry to touch, image good |
| 30% PLEXIGLAS HFI 10-101 70% Lotader AX8900 | 70% PLEXIGLAS HFI 10-101 30% Lotader AX 8900 | 32 | Dry to touch, image good | Dry to touch, image good |
| 50% Krystalgran PN03-221 50% PLEXIGLAS HFI-7 | 60% PLEXIGLAS HFI-7 40% Lotader 4603 | 18 | Dry to touch, no cracks | Dry to touch, image good |
| 70% Krystalgran PN03-221 30% PLEXIGLAS HFI-7 | 60% PLEXIGLAS HFI-7 40% Lotader 4603 | 14 | Dry to touch, cracks | Dry to touch, image good |
| 30% Krystalgran PN03-221 70% PLEXIGLAS HFI-7 | 60% PLEXIGLAS HFI-7 40% Lotader 4603 | 18 | Dry to touch, no cracks | Dry to touch, image good |
| 50% PLEXIGLAS HFI-7 50% LA2250 | 30% PLEXIGLAS HFI-7 70% Lotryl 29MA03 | 13 | NM | Print is dry, cracks in image |
| 50% PLEXIGLAS HFI-7 50% Krystalgran PN03-221 | 50% PLEXIGLAS HFI-7 50% Krystalgran PN03-221 | 10 | Print is dry, no cracks | Print is dry, no cracks |

By using different blend ratios in adjacent layers to form the print layer, a morphological gradient is created in the print layer resulting in a print layer with varying absorption capacities across the print layer thickness.

Example III

Multilayer films similar to Example I were created by co-extruding the layers as described in Example I but using a PMMA copolymer. The core layer and the adhesive layers were the same as in Example I. The copolymers of PMMA used in the blends are provided in Table III below. Films indicated with an asterisk (*) were nipped to a matte roll during the extrusion process. The films of this example were then tested in the same manner described above for Example I, and the results are recorded below in Table III.

TABLE III

| Print Layer Formulation | Unprinted Film 60° Gloss | Roland XC-540 Soljet Pro II Eco-sol max Quality | Eco-sol Printed Image 60° Gloss | HP Designjet L25500, HP 789 latex ink Quality | HP Printed Image 60° Gloss |
|---|---|---|---|---|---|
| 100% Denka TH-11 | 48 | Cracks, Washed out image(poor color density) | NM | Image is good, no cracks | 53 |
| 50% Denka TH-11 50% Lotryl 29MA03 | 15 * | Dry/no cracks | 46 | NM | NM |
| 40% Denka TH-11 60% Lotryl 29MA03 | 18 * | Dry/no cracks | 49 | Image is good, dry no cracks | 20 |
| 50% Plexiglas HFI-7 50% LA 2250 | 10 | Dry to touch, cracks in image | NM | NM | NM |
| 30% Plexiglas HFI-7 70% LA2250 | 13 | Print is wet | NM | NM | NM |
| 20% Denka TX-100S 80% Plexiglas HFI-7 | 76 | Dry to touch/ cracks | NM | Image is good, no cracks | 52 |
| 50% Plexiglas HFI-7 50% Denka TH-11 | 66 | Dry to touch, cracks in image | NM | NM | NM |
| 40% SAN 60% Plexiglas HFI-7 | 91 | Severe cracks, image washed out (poor color density) | NM | No cracks, dry to touch, image washed out (poor color density) | NM |

As shown in Table III, the addition of ethylene acrylic copolymer content in the blend of PMMA or copolymer of PMMA eliminates the cracks that are observed in the image when printed with eco-sol ink.

Example IV

Example V was a multilayer film produced similar to the Example I except that the print layer included a blend of PMMA and an ethylene-based copolymer and a block copolymer to improve the phase compatibility and, consequently, the gloss of the print surface. The components for the print layer were first compounded using a twin screw extruder equipped with a pelletizer. The compounded pellets were then fed into the single screw extruder as described in Example I. Printability was tested with Roland eco-sol system described above, which had been established in previous testing as the most difficult solvent to print, and HP Patex L25500 printers. The copolymers and layers are listed in Table IV. The surface gloss of the films were measured using Gardner Glossmeter and are reported below, wherein the data represents the average of the gloss measured in MD and CD. The following materials are also reference in this example:

| Trade Name | Copolymer | Manufacturer |
|---|---|---|
| Xiran SE 700 | Styrene maleic anhydride (15% maleic anhydride) | Polyscope |
| Xiran SZ23110 | Styrene maleic anhydride (23% maleic anhydride) | Polyscope |
| Xiran SZ1570 | Styrene maleic anhydride (15% maleic anhydride) | Polyscope |
| Kraton G 1726 | Styrene-butylene (diblock) | Kraton Polymers |
| Kraton G 1657 | Styrene-butylene-Styrene (triblock) | Kraton Polymers |
| Blendex 6201 | Styrene acrylonitrile/Maleic anhydride | Galata Chemicals |
| Royaltuf 373P20 | 50% Styrene acrylonitrile/50% Ethylene propylene diene monomer (EPDM) | Chemtura Corporation |
| Nanostrength MAM-M52 | PMMA-Poly(butyl acrylate)-PMMA (triblock) | Arkema |
| Elvaloy 4926 | Ethylene vinylacetate carbon monoxide | Dupont |

TABLE IV

| Blend Formulation | Unprinted Film 60° Gloss % | Eco-sol | Eco-Sol Printed Image 60° Gloss | HP Latex | HP Printed Image 60° Gloss |
|---|---|---|---|---|---|
| 30% PLEXIGLAS HFI-7 50% Lotryl 29MA03 20% Kraton G 1726 | 17 | Dry, image good | 40 | Image is good, no cracks | 27 |
| 25% PLEXIGLAS HFI-7 55% Lotryl 29MA03 10% Kraton G 1657 10% Xiran SZ15170 | 16 | Dry, image good | 36 | NM | NM |
| 25% PLEXIGLAS HFI-7 65% Lotryl 29MA03 10% Xiran SE 700 | 13 | Dry, image good | 40 | NM | NM |
| 30% PLEXIGLAS HFI-7 60% Lotryl 29MA03 10% Blendex 6201 | 16 | Dry, image good | 42 | Image is good, no cracks | 32 |
| 30% PLEXIGLAS HFI-7 60% Lotryl 29MA03 10% Royaltuf 373P20 | 6 | Dry, image good | 20 | Image is good, no cracks | 15 |
| 30% PLEXIGLAS HFI-7 50% Lotryl 29MA03 10% Xiran SZ 15170 10% Kraton G 1726 | 16 | Dry, image good | NM | Image is good, no cracks | 28 |
| 30% PLEXIGLAS HFI-7 60% Lotryl 29MA03 10% Denka TH-11 | 16 | Dry, image good | 39 | NM | NM |
| 30% PLEXIGLAS HFI-7 60% Lotryl 29MA03 10% Xiran SZ23110 | 10 | Dry, image good | 30 | Image is good, no cracks | 20 |
| 30% PLEXIGLAS HFI-7 60% Lotryl 29MA03 10% Xiran SZ15170 | 12 | Dry, image good | 34 | NM | NM |
| 53% PLEXIGLAS HFI-7 37% Lotryl 29MA03 10% Kraton G 2832 | 17 | Dry, image good | 40 | NM | NM |
| 65% PLEXIGLAS HFI-7 25% Lotryl 29MA03 10% Elvaloy 4926 | 21 | Dry, image good | 44 | NM | NM |
| 30% PLEXIGLAS HFI-7 50% Etylene Vinyl acetate 10% Xiran SZ15170 10% Kraton G 1726 | 16 | Dry, image good | 42 | Image is good, dry, no cracks | 39 |

Example V

Example V was a multilayer film formed similar to Example III above but using PMMA from three different sources. With reference to Table V below, the Parapet TNA was sourced from Kuraray America and the nanostrength polymers were obtained from Arkema. The print layer formulation was pre-compounded using a twin screw extruder as described in Example IV. The preformed pellet was fed into a screw extruder and co-extruded into a multilayer film. The resulting multilayer films were evaluated using the same Roland eco solvent printer discussed above and a Mimaki JV33 (mild solvent) inkjet printer available form Mimaki, USA.

pounded into a pellet before being fed into a single screw extruder. In addition, extrudate from the die was cooled onto a chrome roll and nipped with a rubber roll to improve the

TABLE V

| Blend Formulation (Print layer) | Core Layer Formulation | Adhesive Layer Formulation | 60° Gloss | Roland Eco-sol Printer (Comments/ 60° Gloss) | Mimaki Mild solvent Printer (Comments/ 60° Gloss) |
|---|---|---|---|---|---|
| 30% Parapet TNA 60% Lotryl 29MA03 10% Kraton G 1657 | 57% FHR LDPE 43% Ampacet TiO2 | 60% LDPE 30% Ampacet 111712 10% EVA | 9 | Dry to touch, good image 40 | Dry to touch, good image 26 |
| 40% Parapet TNA 52% Lotryl 29MA03 8% Kraton G 1657 | 57% FHR LDPE 43% Ampacet TiO2 | 60% LDPE 30% Ampacet 111712 10% EVA | 9 | Dry to touch, good image 38 | Dry to touch, good image 24 |
| 40% Parapet TNA 52% Lotryl 29MA03 8% Xiran SE700 | 57% FHR LDPE 43% Ampacet TiO2 | 60% LDPE 30% Ampacet 111712 10% EVA | 8 | Dry to touch, poor color density 17 | Dry to touch, poor color density 17 |
| 40% Plexiglas HFI-7 52% Lotryl 29MA03 8% Kraton G 1657 | 57% FHR LDPE 43% Ampacet TiO2 | 60% LDPE 30% Ampacet 111712 10% EVA | 25 | Dry to touch, good image 47 | Dry to touch, good image 48 |
| 50% Nanostrength E21 50% Lotryl 29MA03 | 57% FHR LDPE 43% Ampacet TiO2 | 60% LDPE 30% Ampacet 111712 10% EVA | 28 | Dry to touch, very good image 49 | Dry to touch, very good image 57 |
| 50% Nanostrength MAM-M52 50% Lotryl 29MA03 | 57% FHR LDPE 43% Ampacet TiO2 | 60% LDPE 30% Ampacet 111712 10% EVA | 17 | Dry to touch 25 | Dry to touch 30 |
| 100% Nanostregth MAM-M52 | 57% FHR LDPE 43% Ampacet TiO2 | 60% LDPE 30% Ampacet 111712 10% EVA | N/A | Dry, washed out image (poor color density) | N/A |

As demonstrated by the results above, the addition of block copolymer to the blend as a compatibilizer may improve the print quality of the image as well as the structural compatibility with ethylene methacrylate. In some embodiments, it was also observed that Nanostrength E21, which has polybutadiene midblock, shows better gloss and print characteristics than Nanostrength M52, which has poly(butyl acrylate) midblock.

Example VI

In this example, multilayer films were formed similar to Example III. The print layer formulation was pre-compounded into a pellet before being fed into a single screw extruder. In addition, extrudate from the die was cooled onto a chrome roll and nipped with a rubber roll to improve the surface gloss of the incompatible blend layer. The formulations are listed in Table VI below.

The films were tested for printability and gloss by printing the image using a variety of inkjet systems. The gloss of the film was tested before and after printing the image. In addition to the previously-described printers, a Mimaki UJF 3042 (UV inkjet) printer available from Mimaki USA was also used in this testing. The testing results are provided in Table VI below.

TABLE VI

| Sample | Print Layer Formulation | Print Layer Thickness (mils) | Unprinted Film 60° Gloss | Roland XC-540 (Eco-sol) Inkjet Printer 60° Gloss | HP L25550 (Latex ink) Inkjet Printer 60° Gloss | Mimaki UJF 3042 (UV ink) Inkjet Printer 60° Gloss | Mimaki JV33 (Mild solvent) Inkjet Printer 60° Gloss |
|---|---|---|---|---|---|---|---|
| 1 | 60% Lotryl 29MA03 40% Denka TH-11 | 1.2 | 52 | 55 | 59 | 20 | 73 |
| 2 | 30% Plexiglas HFI-7 60% Lotryl | 1.25 | 60 | 64 | 67 | 20 | 74 |

TABLE VI-continued

| Sample | Print Layer Formulation | Print Layer Thickness (mils) | Unprinted Film 60° Gloss | Roland XC-540 (Eco-sol) Inkjet Printer 60° Gloss | HP L25550 (Latex ink) Inkjet Printer 60° Gloss | Mimaki UJF 3042 (UV ink) Inkjet Printer 60° Gloss | Mimaki JV33 (Mild solvent) Inkjet Printer 60° Gloss |
|---|---|---|---|---|---|---|---|
| 3 | 29MA03 10% Kraton G 1657 30% Plexiglas HFI-7 60% Lotryl 29MA03 10% Denka TH-11 | 1.08 | 63 | 56 | 54 | 21 | 69 |
| 4 | 25% Plexiglas HFI-7 50% Lotryl 29MA03 15% Denka TH-11 10% Kraton G 1726 | 1.5 | 62 | 61 | 60 | NM | 74 |
| 5 | 30% Plexiglas HFI-7 60% Lotryl 29MA03 10% Polyscope SE700 | 1.23 | 54 | 62 | 51 | NM | 71 |
| 6 | 25% Plexiglas HFI-7 50% Lotryl 29MA03 15% Polyscope SE 700 10% Kraton G 1726 | 1.40 | 59 | 58 | 59 | NM | 71 |

From the results above, it was observed that the use of a chrome casting roll resulted in improved gloss of the film. For reference, it was observed that the gloss of the films tested above were generally comparable to the gloss of the TrueImpact ("TMP") 7000 series product sold commercially by Avery Dennison Corporation, which is a gloss in the range of about 50 to about 70.

Figure 5:
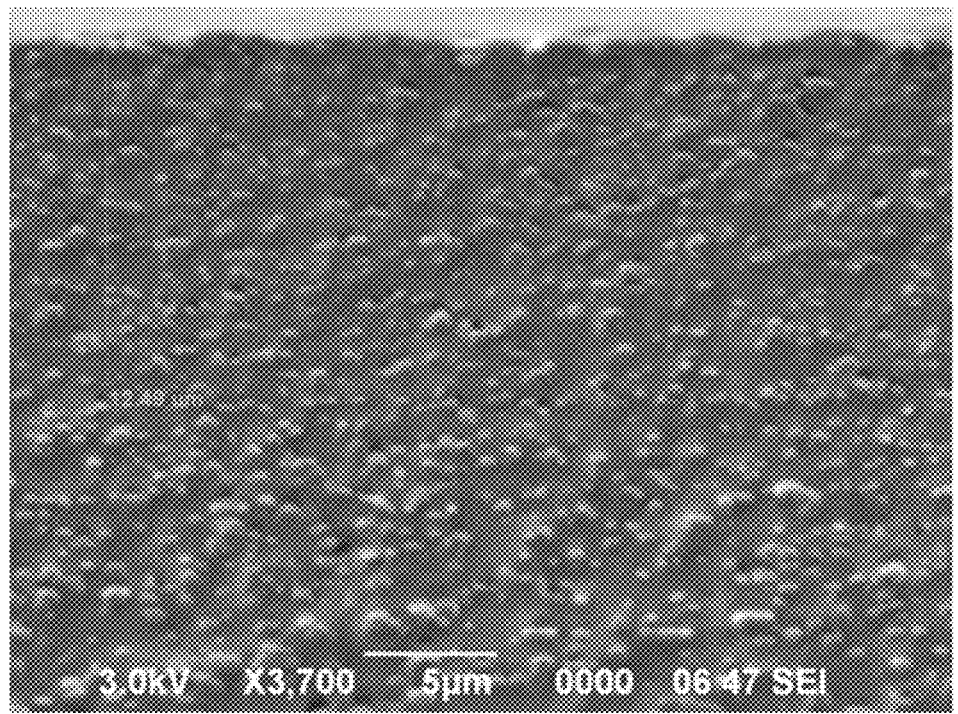
FIG. 5 is an electron scanning microscope image of an additional printing layer embodiment.

Scanning electron microscope images were also obtained for some of the films in Table IV. For example, FIG. 5 is a scanning electron microscope cross-section image of a print layer formulation having 30% Plexiglas HFI-7, 60% Lotryl 29MA03, and 10% Kraton G1657 (Sample 2 in Table VI). It was observed in this image that the copolymer formulation in the print layer reduced the size of the domains of the incompatible blend.

In addition, the films from Table VI were tested for printability on each printer described in Table Vi. Upon review, the print image from each printer was of good and suitable quality. In addition, no image showed any print defects.

The print images obtained from the Roland XC-540 (eco-sol) printer, HP L25500 (latex) printer, and Mimaki JV33 (mild solvent) printers were further analyzed using a QEA PIAS-II meter to determine the dot size and ink bleeding characteristics of the print quality obtained from the multilayer films of the present invention against TrueImpact ("TMP") 7000 (sustainable print media sold by Avery Dennison Corporation) and the standard vinyl products under the trade name MP12105 and MPI 2900 also sold by Avery Dennison Corporation. The following results were recorded:

TABLE VII

Dot Size Results

| Print Media | Roland XC-540 Eco-sol Mean Dot Size (Micron) | HP L25500 Latex Mean Dot Size (Micron) | Mimaki Mild Solvent Mean Dot Size (Micron) |
|---|---|---|---|
| TrueImpact (TMP 7000) | 39.5 | 41.7 | N/A |
| MPI2105 | 40.4 | 48 | N/A |
| MPI2900 | 54.2 | 45 | 45.5 |
| Sample 1 | 47.5 | N/A | 34.3 |
| Sample 2 | 46.8 | N/A | 38.6 |
| Sample 3 | 44.4 | 39.3 | 35.5 |
| Sample 4 | 47.1 | 38.9 | 36.4 |
| Sample 5 | 42.7 | N/A | 34.5 |
| Sample 6 | 47.9 | N/A | 35.5 |

TABLE VIII

Color Bleeding Measurements

| Print Media | Roland XC-540 Width of black line in magenta area (micron) | Roland XC-540 Width of magenta line in black area (micron) | HP L2550 Width of black line in magenta area (micron) | HP L2550 Width of magenta line in black area (micron) | Mimaki Width of black line in magenta area (micron) | Mimaki Width of magenta line in black area (micron) |
|---|---|---|---|---|---|---|
| TrueImpact (TMP 7000) | 1113.0 | 859.0 | 1085.0 | 869.0 | N/A | N/A |
| MPI2105 | 1120.7 | 871.7 | 1079.3 | 894.7 | N/A | N/A |
| MPI 2950 | 1097.7 | 904.1 | 1106.0 | 898.7 | 1458.6 | 1143.9 |
| Sample 1 | 1113.4 | 888.3 | N/A | N/A | 1499.3 | 1148.3 |
| Sample 2 | N/A | N/A | N/A | N/A | N/A | N/A |
| Sample 3 | 1094.1 | 869.9 | 1108.6 | 872.2 | 1529.1 | 1108.7 |
| Sample 4 | 1141.9 | 841.9 | 1141.1 | 832.3 | 1567.4 | 1070.2 |
| Sample 5 | 1118.0 | 864.7 | N/A | N/A | 1436.3 | 1094.5 |
| Sample 6 | 1149.8 | 826.1 | N/A | N/A | 1544.6 | 1065.3 |

As shown above, both the dot sizes and the bleed characteristics of the multilayer films of the present invention are similar in quality to known vinyl products in the market. In addition, the print quality between the multilayer films of the present invention are similar to the accepted print quality of the known vinyl media.

Example VII

In this example, a TrueImpact overlaminate film sold by AveryDennison Corporation as TOL 7000 series was laminated with the 58072 adhesive, available from Avery Dennison, to the print surface of some of the samples of Example VI. The 60-degree gloss of the TOL 7000 series was measured to be between 80-90. As provided in the results below, it was observed that the gloss of the film with the laminate may be significantly increased with a laminate relative to the original film.

| Sample ID | Unprinted film gloss | Gloss of laminated film |
|---|---|---|
| Sample 2 | 67 | 84 |
| Sample 5 | 61 | 85 |
| Sample 6 | 65 | 85 |

Example VIII

Multilayer films were formed similar to Example III. The print layer formulation of 60% Lotryl 29MA03 and 40% Plexiglas HFI-7 was pre-compounded using a twin screw extruder into a pellet before being fed into a single screw extruder. The extruder RPM values were changed to create three different samples with different print layer thicknesses. The formulations, thicknesses (determined from scanning electron microscope measurements), and results were as follows:

| Formulation | Print Layer Thickness | Eco-sol Printing Comments |
|---|---|---|
| 40% Plexiglas HFI-7 60% Lotryl 29MA03 | 1.2 mils | Dry to touch, good image |
| 40% Plexiglas HFI-7 60% Lotryl 29MA03 | 0.73 mils | Dry to touch, good image |

-continued

| Formulation | Print Layer Thickness | Eco-sol Printing Comments |
|---|---|---|
| 40% Plexiglas HFI-7 60% Lotryl 29MA03 | 0.38 mils | Wet in the dark colors |

These results suggest that a minimum thickness of the print layer should be greater than 0.38 mils to achieve drying of the image.

Embodiments of the present invention may be used for any suitable purpose. In some embodiments, films of the present invention may be printed to create signs, posters, banners, and other printed materials. Films of the present invention may be printed upon using a selection of one or more inks from a variety of inks. In specific embodiments, films of the present invention may be suitable for inkjet printing. Generally in inkjet printing, ink is deposited onto the film surface as dots, which then spread and join together to provide, ideally, a substantially uniform appearance. As demonstrated by the examples above, films of the present invention do not, in some embodiments, require a specific type of ink but may be suitably printed with one or more of a variety of suitable inks for inkjet printing.

These and other modifications and variations to the present invention may be practiced by those of ordinary skill in the art without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A printing layer comprising a plurality of sublayers; wherein each sublayer independently comprises a blend of at least one high absorption capacity material selected from the group consisting of poly(methyl methacrylate), modified poly(methyl methacrylate), impact modified polystyrene, styrene acrylic copolymer, styrene-olefin copolymer, styrene-acrylic-olefin copolymer, acrylonitrile butadiene styrene polymer, styrene acrylonitrile polymer, copolyester polymer; and at least one low absorption capacity material;

wherein the at least one low absorption material comprises an olefin polymer; and wherein an absorption capacity gradient is present between at least two adjacent sublayers within the printing layer.

2. The printing layer of claim 1 wherein the olefin polymer is one or more of ethylene acrylate copolymers, ethylene vinyl acetate, ethylene acrylic ester terpolymer, and styrene-ethylene/butylenes-styrene (SEBS) block copolymer.

3. The printing layer of claim 1 wherein the olefin polymer is selected from the group consisting of random copolymers and block copolymers.

4. The printing layer of claim 1 wherein the printing layer consists of two sublayers.

5. The printing layer of claim 1 wherein the printing layer comprises a first sublayer and a second sublayer; wherein the second sublayer comprises absorbing particles.

6. The printing layer of claim 1 wherein at least one sublayer of the printing layer comprises poly(methyl methacrylate) as the high absorption capacity material; and wherein the poly(methyl methacrylate) is present in an amount of from about 20% to about 83% by weight of the at least one sublayer.

7. The printing layer of claim 1 further comprising a compatibilizer.

8. The printing layer of claim 1 further comprising free radical scavengers and an ultraviolet light stabilizer.

9. A film for printing comprising a printing layer, a core layer, and an adhesive layer, wherein the core layer is between the printing layer and the adhesive layer, and wherein the printing layer comprises a plurality of sublayers;

wherein each sublayer independently comprises a blend of at least one high absorption capacity material selected from the group consisting of poly(methyl methacrylate) and modified poly(methyl methacrylate); and at least one low absorption capacity material;

wherein the at least one low absorption material comprises one or more polyolefin polymers; and wherein an absorption capacity gradient is present between at least two adjacent sublayers within the printing layer.

10. The film of claim 9 further comprising a tie layer located between the printing layer and the core layer.

11. The film of claim 9 wherein the core layer further comprises color pigments.

12. The film of claim 9 wherein the adhesive layer comprises ethylene vinyl acetate.

13. The film of claim 9 further comprising an overlaminate adhered to the printing layer.

14. The printing layer of claim 1 wherein the printing layer has a thickness greater than 0.38 mils.

15. The printing layer of claim 1 wherein at least one of the sublayers comprises at least about 20% by weight of high absorption capacity material, and at least about 10% by weight of low absorption capacity material.

16. The film of claim 9 wherein the printing layer comprises a first sublayer and a second sublayer; wherein the second sublayer comprises absorbing particles.

17. The film of claim 9 wherein at least one sublayer of the print layer comprises poly(methyl methacrylate) as at least 50% by weight of the layer and wherein at least one sublayer of the printing layer comprises less than 50% by weight of poly(methyl methacrylate).

18. The film of claim 9 further comprising free radical scavengers and an ultraviolet light stabilizer.

19. The film of claim 18 wherein the free radical scavengers comprise hindered amine light stabilizer (HALS) in an amount of about 0.05 to about 2 percent by weight.

20. The film of claim 18 wherein the ultraviolet light stabilizers comprise benzophenone in amounts ranging from about 0.1 to about 5 percent by weight.

21. The printing layer of claim 1 wherein the printing layer further comprises one or more pigments, antiblock agents, and/or matting agents.

22. The film of claim 20 wherein the film further comprises a removable release liner and a pressure sensitive adhesive, wherein the pressure sensitive adhesive is disposed upon the adhesive layer and the release liner is adjacent to the pressure sensitive adhesive, such that the pressure sensitive adhesive is disposed between the adhesive layer and the release liner.

23. The printing layer of claim 2, wherein the ethylene acrylate copolymers are selected from the group consisting of ethylene acrylic acid, ethylene methyl acrylate, and ethylene butyl acrylate.

24. The printing layer of claim 1, wherein the at least one high absorption capacity material comprises the styrene-acrylic-olefin copolymer.

25. The printing layer of claim 1, wherein the olefin polymer comprises ethylene butyl acrylate.

26. The printing layer of claim 1, wherein the olefin polymer comprises an ethylene acrylic ester terpolymer.

27. The printing layer of claim 1, wherein the at least one high absorption capacity material comprises poly(methyl methacrylate); and wherein the at least one low absorption capacity material comprises an ethylene-acrylic copolymer.

28. The film of claim 9, wherein the at least one high absorption capacity material comprises poly(methyl methacrylate); and wherein the at least one low absorption capacity material comprises an ethylene-acrylic copolymer.

29. The printing layer of claim 1, wherein some but not all of the sublayers comprise free radical scavengers and an ultraviolet light stabilizer.

30. The film of claim 9, wherein some but not all of the sublayers comprise free radical scavengers and an ultraviolet light stabilizer.

31. The printing layer of claim 1 wherein at least one of the sublayers comprises at least 17% by weight of the at least one low absorption capacity materials and at most 83% by weight of the least one high absorption capacity material.

* * * * *